United States Patent [19]
Krooss

[11] 3,920,118
[45] Nov. 18, 1975

[54] BOTTLE SENSING APPARATUS

[76] Inventor: Robert J. Krooss, 74 Ball Road, Mountain Lakes, N.J. 07046

[22] Filed: Oct. 9, 1973

[21] Appl. No.: 404,773

[52] U.S. Cl. ................... 198/262; 198/40; 198/263
[51] Int. Cl.² ........................................ B65G 47/24
[58] Field of Search .............. 198/262, 263, 265, 40

[56] References Cited
UNITED STATES PATENTS

| 3,020,997 | 2/1962 | Schell | 198/40 X |
| 3,126,088 | 3/1964 | Dudas | 198/40 |
| 3,493,096 | 2/1970 | Antoszewski et al. | 198/265 X |

Primary Examiner—Evon C. Blunk
Assistant Examiner—Douglas D. Watts
Attorney, Agent, or Firm—Stephen E. Feldman

[57] ABSTRACT

An apparatus for sensing whether a bottle is oriented with its handle in the proper position as it is being conveyed on a conveyor belt. The sensing mechanism comprises two fingers which are spring-biased into contact with a vertical surface of the bottle, the sensing fingers being positioned one above the other, so that when one is in contact with the handle area, the other is in contact with a similar surface where there is no handle present. The comparison of the difference in position of the sensing fingers determines whether a handle is present. This difference is indicated by suitable photocells associated with the fingers. Other photocells determine when the bottle is in the proper position for the sensing fingers to be actuated. If the photocells determine that the bottle is oriented with its handle in the wrong direction, a suitable turning mechanism is actuated to turn the bottle so that it is positioned with its handle in the correct position.

4 Claims, 6 Drawing Figures

FIG. 3
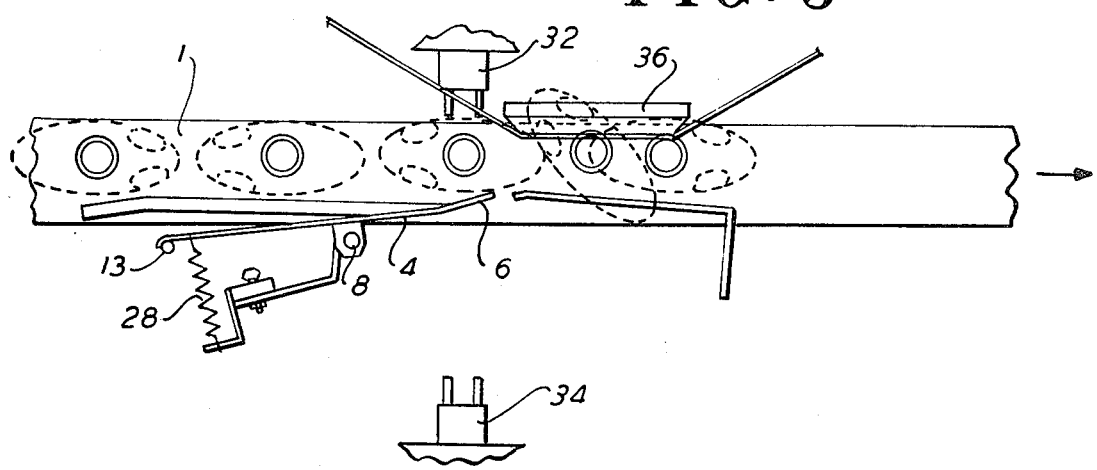
FIG. 4
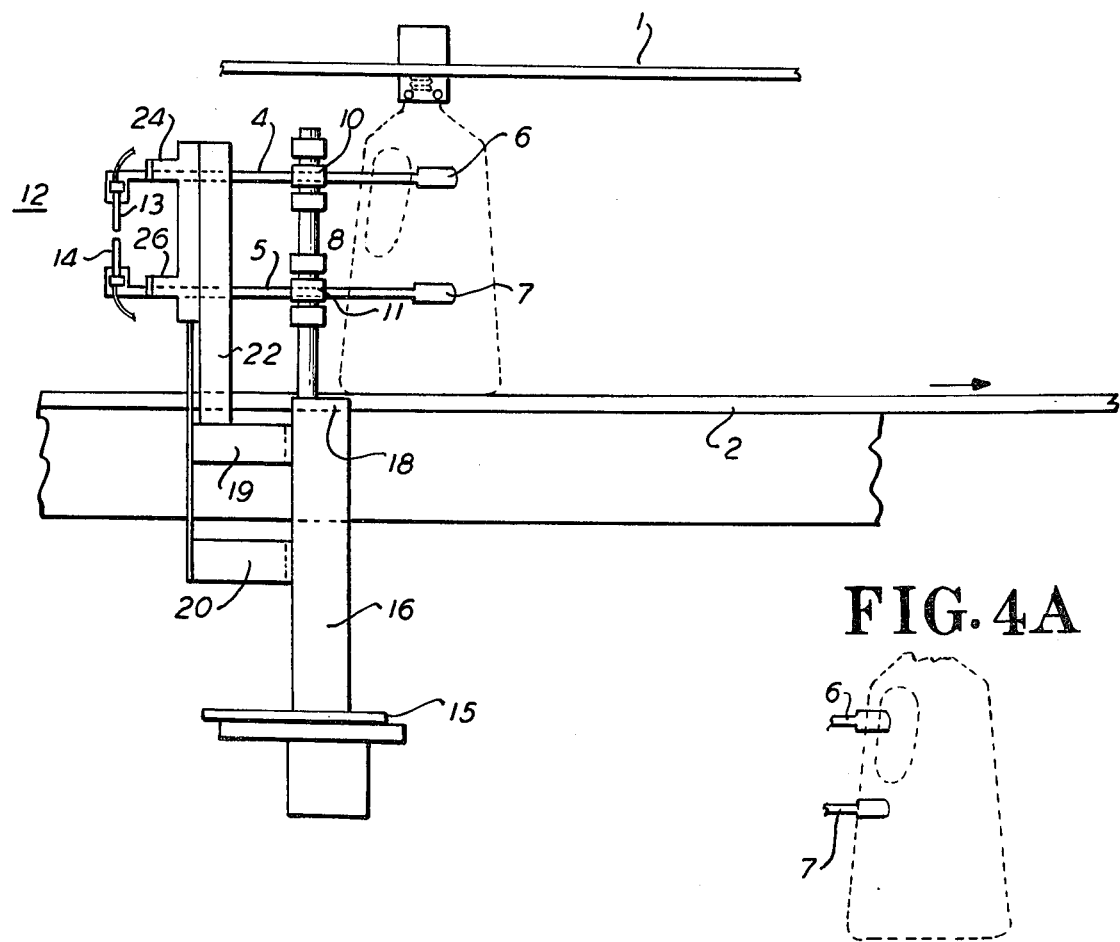
FIG. 4A

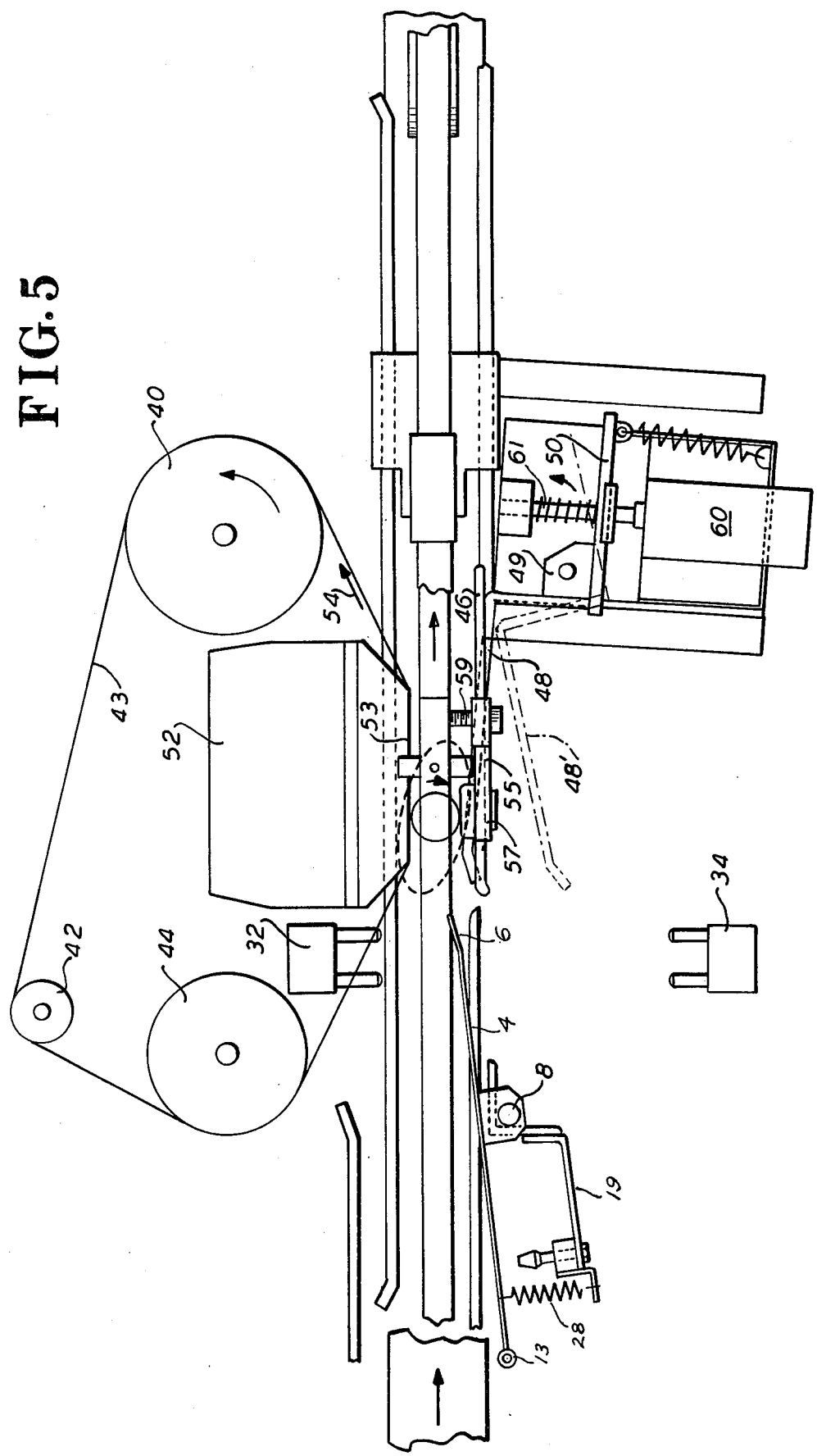

BOTTLE SENSING APPARATUS

BACKGROUND OF THE INVENTION

Plastic bottles are now in widespread use and come in many sizes and shapes. Many of these shapes are asymmetric, having one side of a different shape than the other. Often, this difference is due to a handle or other gripping device, such as a dimple, which is positioned to permit grasping of the bottle and pouring of its contents. However, these asymmetric configurations lead to a problem in packaging and filling the bottles. The problem is that for proper packaging and filling, it is necessary that all of the bottles be positioned wih the handle in the same direction. Thus, machinery is necessary which can simply and quickly properly determine whether the bottle is moving along a conveyor with its handle in the proper direction, and if it is not, actuate suitable turning mechanism which will turn the bottle so it is correctly oriented.

At present, there are various types of sensing mechanisms which sense this orientation of bottles. However, most of these sensing mechanisms depend on very sensitive devices that can only operate if the bottle is positioned in a very specific position. If the bottle is positioned slightly incorrectly, the sensing device may not properly operate and the bottle then will not be turned. Also many of the present mechanisms are very expensive because of their structural complexity; that is, they require a very intricate structure to insure that they properly operate at all times. There are also many structures that rely on photocells alone. However, these tend to be very rigid in their sensing and thus not properly responsive if a bottle is not in the exact expected position. Most, if not all of these sensing mechanisms relied on a single sensing mechanism and on a definite position of the bottle. If the bottle was slightly axially displaced, the sensing mechanism would probably not indicate the correct position of the handle. Thus, a mechanism would be desirable if it would operate with a substantial margin or error so that even if the bottle is not in exactly the correct axial position, the mechanism will nevertheless correctly sense the position of the handle and properly actuate the corresponding turning mechanism when it is needed.

SUMMARY OF THE INVENTION

A bottle sensing mechanism to determine whether a bottle is travelling with its handle in the correct position. The sensing mechanism comprises two spring-biased fingers which are positioned to contact the bottle in two locations on the same vertical surface; one in the area of the handle and one in a non-handle area. A photoelectric switch is positioned on the fingers and the fingers are normally aligned. When a handle is detected, the non-alignment of the fingers will indicate the presence of the handle. This will or will not, depending on the desired direction of the bottle, actuate suitable turning mechanism. The sensing mechanism, by comparing the relative position of the two fingers sensing the same vertical surface, does not reside on one sensing device, but in a comparison. This comparison permits substantial misalignment of the bottle axially while still being able to function properly to sense the direction of the handle.

An object of this invention is to provide a sensing mechanism for determining the orientation of a bottle - whether it is moving along a conveyor with its handle leading or trailing.

Another object of this invention is to provide a sensing mechanism for determining the orientation of a bottle by comparing two different locations on the same vertical surface of the bottle.

Another object of the invention is to provide an efficient and accurate sensing mechanism which employs two fingers to sense the two locations on the bottle.

A further object of this invention is to provide a sensing mechanism which uses photocells to compare the position of the fingers.

A further object of the invention is to provide such a sensing mechanism which actuates a turning mechanism to turn the bottle when it is not correctly oriented.

BRIEF DESCRIPTION OF THE DRAWINGS

FIG. 3 shows the mechanism of FIG. 1 where the sensing mechanism has sensed that the bottle is oriented incorrectly and the turning mechanism has been actuated.

FIG. 4 is a cut-away view of FIG. 3.

FIG. 4A is an alternative embodiment of the invention of FIG. 4.

FIG. 5 shows the sensing mechanism of FIG. 1 including a suitable turning mechanism.

PREFERRED EMBODIMENT OF THE INVENTION

Figure 1:
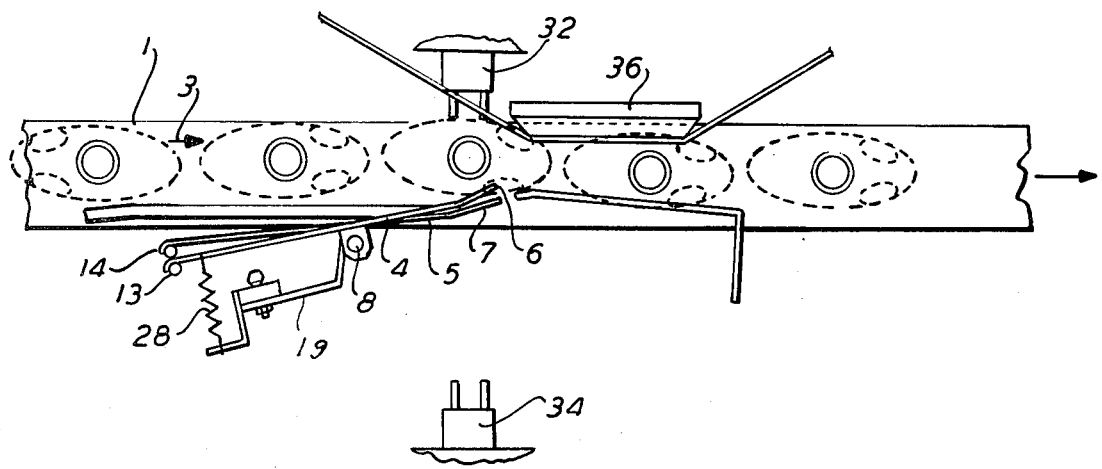
FIG. 1 shows an overall view of the sensing mechanism of this invention.
Figure 2:
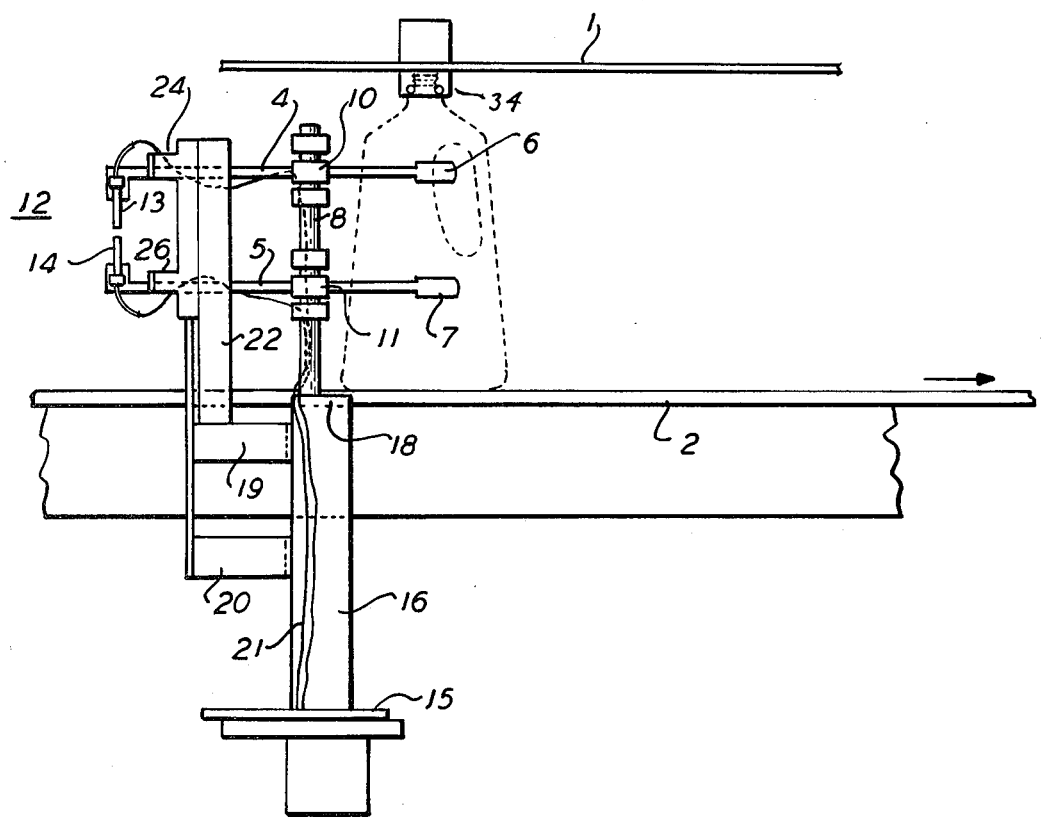
FIG. 2 is a cut-away side view of the mechanism of FIG. 1.

The sensing mechanism is used with bottle or container transporting equipment such as the equipment used to transport the bottles during filling and/or packing. In such equipment, bottles are transported by suitable conveyor belts, for example, as shown in FIGS. 1 and 2. Conveyor belts 1 and 2 are positioned to transport the bottles in the direction of arrow 3, that is, from left to right in FIG. 1. The bottles are positioned so that they ride between the conveyor belts with conveyor belt 1 being positioned on the top of the bottles and conveyor belt 2 being positioned below the bottles. This is shown more clearly in FIG. 2. These two conveyor belts are suitably driven by a motor or other mechanism so that the bottles are transported from left to right. It is noted that this conveyor mechanism is but one of many that can be employed to properly transport the bottles.

The sensing mechanism of this invention, which is to determine the direction of travel of the bottles - whether they are travelling with the handle leading or trailing, comprises two spring-biased sensing fingers 4 and 5. These fingers are long, thin, flat members having slightly bent forward tabs 6 and 7 which were positioned to contact the bottle. These tabs are displaced at an angle of about ten degrees with respect to the sensing fingers and are alightly wider and thinner than the rest of the fingers. The fingers are horizontally positioned and journalled for rotational movement about a vertical shaft 8.

Each of the fingers also has a cylindrical extension 10 and 11 positioned near the center of its length. Shaft 8 is positioned in these extensions so that the fingers can rotate about the shaft 8. At the end of the fingers most distant from tabs 6 and 7, a photo-electric switch 12 is positioned. The eye of the switch 13 is positioned on the upper of the two fingers and in a downward vertical direction. The lamp part 14 of the switch is positioned on the other finger and in an upward vertical direction towards the eye. The positions of the two can be reversed, of course, if desired. The eye and lamp are positioned so that the light from the lamp reaches the eye when the fingers are axially aligned; that is, when the tab on one finger is directly above the tab on the other finger. As will be described later on, this occurs when neither finger is sensing a handle.

To support the fingers, a fixed L-shaped cantilevered structure is provided. This structure comprises a base 15 on which is supported a standing member 16. The latter has a circular opening 18 into which shaft 8 is positioned. Two flat horizontal members 19 and 20 extend from member 16 and support upstanding members 22. These members include two tab-like extensions 24 and 26 to which springs are connected, as described hereinafter. The electrical wiring 21 to the lamp 14 and eye 13 runs along the fingers and down along upstanding member 16 to be suitably connected to an energy source (not shown).

Springs 28 and 30 are connected between finger 4 and tab member 24 and finger 5 and tab member 26 as shown in FIG. 2 These springs, bias the fingers in a counter-clockwise direction into position to contact the surface of the bottles.

To determine when the bottle is in the proper position to be sensed by fingers, two photocells 32 and light sources 34 are provided. The photocells are positioned as shown in FIG. 1 to detect the neck of the bottle and thereby indicate when a bottle is in the position to be sensed by the fingers. The two photocells are positioned so that they will both be covered when the bottle is in this position. This is shown in FIG. 2 where the photocells 32a and b are both covered by the neck of the bottle. In this position, the light from light sources 34 will not reach the photocells. It is noted that if the bottle is almost in this position, one of the photocells will be darkened, but not both - light will reach one of the photocells. Thus, the correct position is only where both are dark. It will, of course, be appreciated that the position of the photocells and lamps can be reversed, if desired.

A turning head or other suitable turning mechanims, as will be discussed subsequently, is coordinated with the sensing mechanism so that when the bottles are proceeding along the conveyor with their handles incorrectly oriented, the turning mechanism, on receiving a signal from the sensing means of this invention, will turn the bottles so that their handles are correctly oriented.

One such turning mechanism that can be used when the sensing mechanism of this invention is shown in FIG. 5. This turning mechanism briefly comprises a drive pulley 40, a take up pulley 42, and another pulley 44, around which a drive belt 43 passes. The drive belt passes over the front 53 of th stationary member 52 and moves in the direction of arrow 54. In passing over the front of member 53, the belt contacts one side of the neck of every bottle, as shown in FIG. 5 and attempts to turn the bottle. The other side of the neck of the bottle is contacted by a pad 57 which is positioned on bar 46, which is in turn, supported by member 59. This pad supports the bottle as it is being turned by belt 53. However, gate 46, an L-shaped bar is positioned with long member 55 below bar 46 and positioned so that it will block the turning movement of the bottle. The bottle will then continue to travel along the conveyor without being turned. However, when the sensing mechanism of this invention determines that the bottle is incorrectly oriented, that is, the handle is either leading when it should be trailing, or trailing when it should be leading, the gate is opened by being swung to the lower position 48' as shown in FIG. 5. In this position, the belt 43, when it contacts the bottle, will turn the bottle so that the handle is in the proper position. The turning mechanism consists of a solenoid 60, the plunger 61 of which is connected by means of suitable structural elements bar 50 to gate 48.

Movement of the plunger 61 on response of the sensing mechanism of this invention, causes the gate to swing to position 48' and permit the bottle to turn. If the handle is in the correct position, the sensing mechanism will not cause the solenoid to open the gate and the bottle will not be turned. It will be appreciated that the turning mechanism described, is but one of many that can be used with the sensing mechanism of this invention.

In operation the mechanism functions as follows: Fingers 4 and 5 are biased by springs 28 and 30, so that the end tabs 6 and 7 contact an upper and lower side surface of the bottle, both of which surfaces are along the same vertical line. The upper finger 4 will be positioned to contact the surface where the handle or dimple is positioned, whereas the lower finger will be positioned to contact a non-handle surface of the bottle which is directly below the other surface. Because the mechanism is based on the comparison between the sensing of the two fingers, slight misalignment axially of the bottle will not affect the comparison. Even if the bottle is slightly shifted axially the comparison will still be along one vertical line and thereby will properly take place. If, on the other hand, there was only one sensing means, a slight axially misalignment might result in a completely wrong reading.

In FIGS. 1 and 2, the mechanism is shown as programmed for the bottles to travel in the handle-leading position, that is, when the bottles exit from the mechanism of this invention, they will be travelling along the conveyor belts 1 and 2 with the handles in the forward position. It will be appreciated, of course, that the mechanism can be programmed so that, if desired, the bottles will emerge in the handle-trailing position.

In the present handle-leading position, when a bottle enters the area between photocells 32 and 34, the photocells determine that the bottle is in this position by both photocells being blocked by the neck of the bottle, as aforementioned. FIG. 2 shows this blocking position. In this position, the upper finger 4 will be in contact with the handle or dimple, whereas the lower finger 5 will be in contact with a lower section of the bottle, where there is no handle present, but which is directly below the place where the handle is being sensed. Photo electric switch 12 will then have its eye slightly misaligned from the lamp 13 and the eye will receive no light and will be dark. This is shown more clearly in FIG. 1. Since this is the desired position (handle-leading), the turning mechanism will not be actuated. Thus, if the turning mechanism of finger 5 were used, the gate would not be opened and thereby the bottle would pass through without being turned.

It will be noted that a significant feature of the invention is this comparison by two fingers of the difference in the vertical surfaces where a handle is present and where no handle is present. The sensing mechanism is essentially sensing two positions on the same vertical line and thus, if the vertical line is moved axially, the sensing will still be correct because the fingers are arranged so that they will always both be sensing on the same vertical line. If an indentation or handle is present this comparison will immediately detect it. Thus, the bottle can be slightly misaligned and the sensing will still properly take place. If there was no comparison and only one sensing means were present, a slight axial misalignment might mean that the sensing means would yield the wrong indication.

It will be noted also that the sensing takes place when the neck of the bottle is positioned so as to block both photocells 32 from receiving light from the lamps 34. However, if desired, suitable other photocell arrangements can be provided to determine when the bottle is in a position so that the sensing fingers can be actuated.

Thus, in the present situation, when both neck photocells 32 see dark, and the photo electric switch 12 also sees dark, and the bottle is programmed to be in the handle-leading position, the turning mechanism will not be actuated. If, on the other hand, as shown in FIG. 3, both sensing fingers contact the surface of the bottle where there is no handle, and thereby the sensing fingers are essentially in the same vertical position as shown in FIGS. 3 and 4, the photo electric switch 12 will be aligned so that the eye receives light from the lamp. This would indicate that, since no handle is present where there should be a handle, the bottle is incorrectly oriented - it is in the handle-trailing position as shown in FIG. 3 when the handle-leading position is desired. The photocells 12 in the fingers will then actuate the turning mechanism. It is noted in this instance when the two neck photocells 32 are dark, the photocell 12 receives light.

If it is desired to have a handle-trailing application, the situation would be such that when the two neck photocells 32 were dark, the photo electric switch 12 would receive light to indicate that no handle was present. If photo electric switch 12 was dark in that situation, it would indicate the handle was leading adn would trigger the mechanism and cause the bottle to be turned.

The electric eye equipment and logic related to it are standard types of equipment and logic.

Also, if desired, the sensing fingers can be located on the trailing part of the bottle (instead of on the leading part, as shown in the drawings). This is shown more clearly in FIG. 4A. In this position, when it is desired that the handle both neck photocells will show dark and the photo electric switch 12 will also show dark (if the bottle is oriented correctly). When it is desired that the handle be in the leading position, both neck photocells will show dark when the photo electric switch 12 receives light, if the bottle is oriented correctly.

It will be appreciated that an effective bottle handle sensing mechanism is disclosed. The mechanism operates on the basis of determining the differential vertical alignment between two sensing means and thereby does not rely on one sensing mechanism alone. This provides for a rapid and reliable output that can operate regardless of slight axial misalignments in the bottle orientation.

While specific embodiments of this invention has been disclosed, it will be appreciated that there are many modifications thereof which may be made by one skilled in the art which comes within the true scope and spirit of the invention.

I claim:
1. A bottle orientation sensing mechanism for sensing an asymmetry in a bottle comprising:
   a first sensing finger positioned to contact a first surface of a bottle and sense an asymmetry in the surface of the bottle
   a second sensing finger positioned to sense a second surface of a bottle, said second surface being positioned on substantially the same vertical surface of the bottle as said first surface
   a sensing means including
      a first sensor associated with said first sensing finger,
      a second sensor associated with said second sensing finger, said first and second sensors acting together to indicate the presence or absence of said asymmetry in the surface
   means acting in response to said sensors which is adapted to activate a mechanism to reorient said bottle
   said first and second sensing fingers comprise long thin members which are mounted for pivotal movement into contact with the bottle
   a vertical pivot member on which said sensing fingers are mounted, one of said sensing fingers being mounted directly above the other for movement in a substantially horizontal plane
   said sensing means being electric
   one end of said first finger adapted to contact the bottle and the first sensor being attached to the other end of the finger and wherein one end of said second finger is adapted to contact the bottle and said second sensor is attached to the other end of said second finger
   the first sensor comprising a photoelectric eye and the second sensor comprising a light source, said light source and eye being mounted so that when the first and second fingers are positioned directly above each other, the eye will receive illumination from the light source
   a first spring attached to said first finger proximate said first sensor and a second spring attached to said second finger proximate said second sensor, said springs being mounted to bias said fingers into contact with the bottles
   a support, said vertical pivot member being mounted thereon and said springs being attached thereto
   the asymmetry comprising a grasping means
   sensing means being provided to determine the position of said bottle, said sensing fingers being actuatable in this position, and said sensing means comprising photoelectric eyes and light sources which determine the position by locating the neck of the bottle.

2. The mechanism of claim 1 wherein the grasping means comprises a handle.

3. The mechanism of claim 1 wherein the grasping means comprises a dimple.

4. The mechanism of claim 1 wherein the sensing mechanism is associated with a bottle conveying mechanism.

* * * * *

UNITED STATES PATENT OFFICE
CERTIFICATE OF CORRECTION

Patent No. 3,920,118  Dated 11/18/75

Inventor(s) Robert J. Krooss

It is certified that error appears in the above-identified patent and that said Letters Patent are hereby corrected as shown below:

Column 1, line 62, "on" should read -in-.

Column 2, line 58, "alightly" should read -slightly-.

Column 5, line 40, "adn" should read -and-.

Signed and Sealed this seventeenth Day of February 1976

[SEAL]

Attest:

RUTH C. MASON
Attesting Officer

C. MARSHALL DANN
Commissioner of Patents and Trademarks